US012354383B2

(12) United States Patent
Liu et al.

(10) Patent No.: US 12,354,383 B2
(45) Date of Patent: Jul. 8, 2025

(54) GROUPED MATHEMATICAL DIFFERENTIABLE NMS FOR OBJECT DETECTION

(71) Applicant: Board of Trustees of Michigan State University, East Lansing, MI (US)

(72) Inventors: Xiaoming Liu, Okemos, MI (US); Abhinav Kumar, East Lansing, MI (US); Garrick Brazil, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 793 days.

(21) Appl. No.: 17/677,193

(22) Filed: Feb. 22, 2022

(65) Prior Publication Data

US 2022/0375237 A1    Nov. 24, 2022

Related U.S. Application Data

(60) Provisional application No. 63/155,553, filed on Mar. 2, 2021.

(51) Int. Cl.
| | |
|---|---|
| *G06V 20/64* | (2022.01) |
| *G06T 7/73* | (2017.01) |
| *G06V 10/26* | (2022.01) |
| *G06V 10/762* | (2022.01) |
| *G06V 10/764* | (2022.01) |
| *G06V 10/776* | (2022.01) |
| *G06V 10/82* | (2022.01) |

(52) U.S. Cl.
CPC .............. *G06V 20/64* (2022.01); *G06T 7/73* (2017.01); *G06V 10/26* (2022.01); *G06V 10/763* (2022.01); *G06V 10/764* (2022.01); *G06V 10/776* (2022.01); *G06V 10/82* (2022.01)

(58) Field of Classification Search
CPC ...... G06V 20/64; G06V 10/776; G06V 10/82; G06V 10/764; G06V 10/763; G06T 7/73
See application file for complete search history.

(56) References Cited

U.S. PATENT DOCUMENTS

| | | | | |
|---|---|---|---|---|
| 10,269,125 | B1* | 4/2019 | Kim | ................... G06T 7/277 |
| 2022/0261571 | A1* | 8/2022 | Derks | ................... G06N 20/00 |

* cited by examiner

*Primary Examiner* — Myron Wyche
(74) *Attorney, Agent, or Firm* — Harness, Dickey & Pierce PLC (57) ABSTRACT

An end-to-end trainable grouped mathematically differentiable non-maximal suppression (NMS) technique is presented for monocular 3D object detection. First, formulate NMS as a matrix operation and then group and mask the boxes in an unsupervised manner to obtain a simple closed-form expression of the NMS. This technique addresses the mismatch between training and inference pipelines and, therefore, forces the network to select the best 3D box in a differentiable manner. As a result, the proposed technique achieves state-of-the-art monocular 3D object detection results on the KITTI benchmark dataset performing comparably to monocular video-based methods.

19 Claims, 8 Drawing Sheets

GROUPED MATHEMATICAL DIFFERENTIABLE NMS FOR OBJECT DETECTION

CROSS-REFERENCE TO RELATED APPLICATION

This application claims the benefit of U.S. Provisional Application No. 63/155,553, filed on Mar. 2, 2021. The entire disclosure of the above application is incorporated herein by reference.

GOVERNMENT CLAUSE

This invention was made with government support under W911NF-18-1-0330 awarded by the U.S. Army Research Laboratory. The government has certain rights in the invention.

FIELD

The present disclosure relates to a technique for grouped mathematically differentiable non-maximal suppression (NMS) for object detection.

BACKGROUND 3D object detection is one of the fundamental problems in computer vision, where the task is to infer 3D information of the object. Its applications include augmented reality, robotics, medical surgery, and, more recently path planning and scene understanding in autonomous driving. Most of the 3D object detection methods are extensions of the 2D object detection method Fast R-CNN, which relies on the end-to-end learning idea to achieve State-of-the-Art (SoTA) object detection. These conventional approaches have either proposed changing architectures or losses. Some have tried incorporating confidence or depth in convolution while others have used temporal cues.

Almost all of them output a massive number of boxes for a single object and, therefore, rely on post-processing with a greedy clustering algorithm, called Non-Maximal Suppression (NMS), during inference to reduce the number of false positives and increase the performance. However, these approaches have largely overlooked NMS's inclusion in the training pipeline leading to an apparent mismatch between training and testing pipelines as the losses are applied on all good boxes but not on the final boxes after the NMS. Moreover, 3D object detection, including the monocular ones, suffer from a mismatch between classification and 3D localization. In other words, the classification scores do not represent the true localization of the boxes.

Earlier attempts to include NMS in the training pipeline have been carried out for 2D object detection where the improvements are less visible. Recent approaches to improve the correlation in 3D object detection involve calculating or predicting the scores using likelihood estimation or enforcing the correlation explicitly. Although this improves the 3D detection performance, the improvements are limited as their training pipeline is not end to end in the absence of a differentiable NMS.

To address the mismatch between training and inference pipelines as well as the mismatch between classification and 3D localization, this disclosure proposes including the NMS in the training pipeline, which gives a useful gradient to the network so that it figures out which boxes are the best-localized in 3D and, therefore, should be ranked higher.

This section provides background information related to the present disclosure which is not necessarily prior art.

SUMMARY

This section provides a general summary of the disclosure, and is not a comprehensive disclosure of its full scope or all of its features.

A computer-implemented method is presented for detecting objects in an image. The method includes: receiving a set of predicted bounding boxes from at least one of a two-dimensional classification head or a three-dimensional classification head; receiving scores for each of the predicted bounding boxes in the set of predicted bounding boxes, where the scores for each of the predicted bounding boxes are in form of a vector; computing a set of intersection over union (IoU) measures for the set of predicted bounding boxes; grouping boxes in the set of predicted bounding boxes into one or more groups of predicted bounding boxes; for each group in the one or more groups of predicted bounding boxes, calculating rescores for each of the predicted bounding boxes in the set of predicted bounding boxes by performing matrix operations on the vector of scores in accordance with a closed-form expression; and selecting a subset of boxes from the set of predicted bounding boxes for each object in the image using the rescores for each of the predicted bounding boxes. Preferably, image data for a scene is captured using an imaging device and the set of predicted bounding boxes is determined from the image data.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
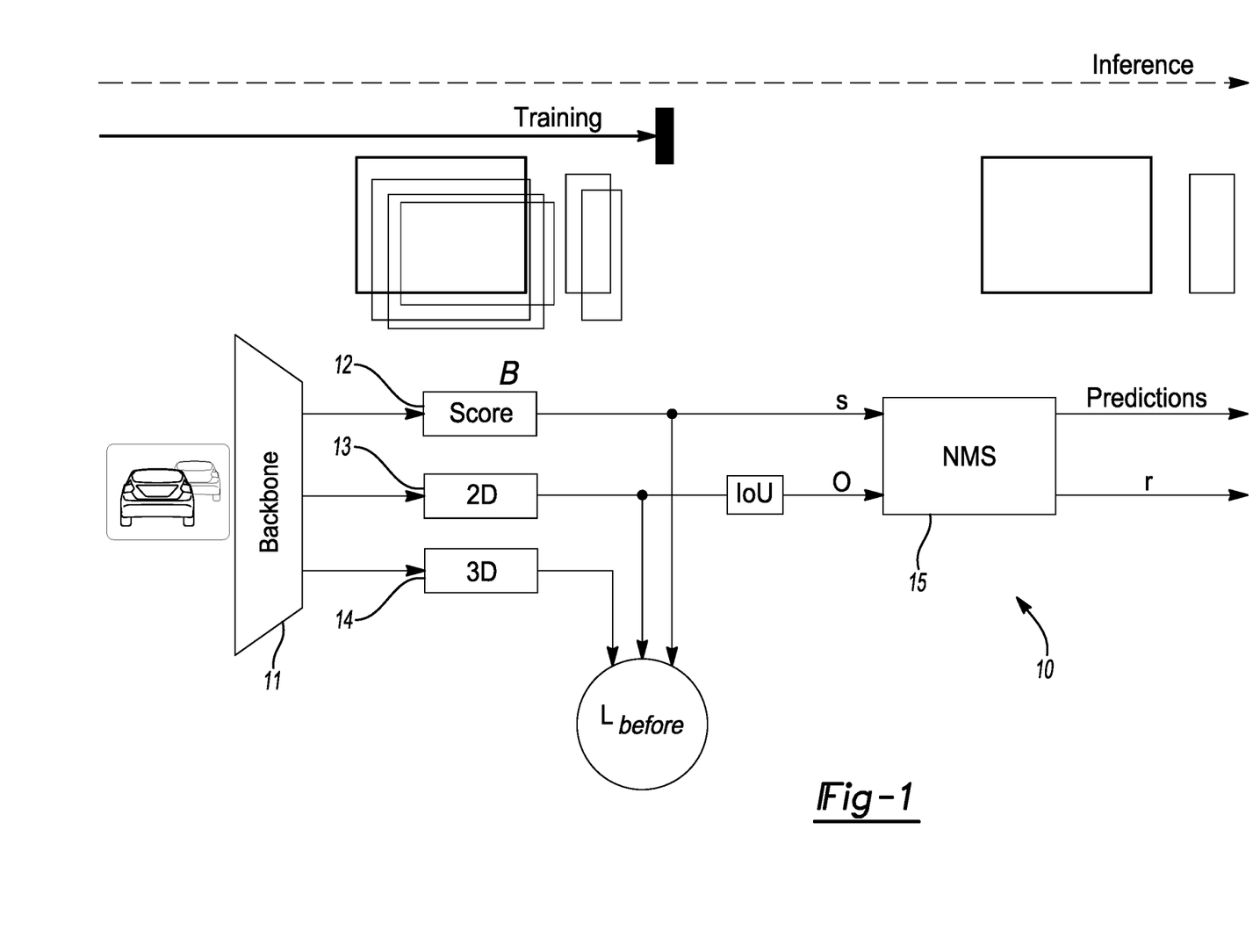
FIG. 1 is a diagram depicting the pipeline for a conventional object detector.

FIG. 1 depicts the pipeline for a conventional object detector 10 using non-maximal suppression (NMS). The object detector 10 includes the backbone of a convolutional neural network 11, a scoring head 12, a two-dimensional regression head 13, a three-dimensional regression head 14 and a NMS module 15. Image data for a scene captured by an imaging device, such as a camera, serves as input to the backbone of the convolutional neural network 11. The backbone in turn determines a set of predicted bounding boxes from the image data. s and r denote scores of predicted bounding boxes before and after the NMS module 15, respectively. O denotes the matrix containing the set of intersection over union (IoU) measures for the set of predicted bounding boxes. $L_{before}$ denotes the losses before the NMS module, such as classification, regression and confidence losses.

Let $B=\{b_i\}^n_{i=1}$ denote the set of boxes or proposals $b_i$ from an image. Let $s=\{s_i\}^n_{i=1}$ and $r=\{r_i\}^n_{i=1}$ denote their scores (before NMS) and rescores (after NMS) respectively such that $r_i, s_i \geq 0 \forall i$. D denotes the subset of B after the NMS. Let $O=[o_{ij}]$ denote the n×n matrix with $o_{ij}$ denoting the $IoU_{2D}$ of $b_i$ and $b_j$. The pruning function p decides how to rescore a set of boxes D based on $IoU_{2D}$ overlaps of its neighbors, sometimes suppressing boxes entirely. In other words, $p(o_i)=1$ denotes the box $b_i$ is suppressed while $p(o_i)=0$ denotes $b_i$ is kept in D. $N_t$ denotes the NMS threshold while T denotes the temperature.

B is partitioned into different groups $G=\{G_k\}$. $B_{Gk}$ denotes the subset of B belonging to group k. Thus, $B_{Gk}=\{b_i\} \forall b_i \in G_k$ and $B_{Gk} \cap B_{Gl}=\emptyset \forall l k \neq l$. $G_k$ in the subscript of a variable denotes its subset corresponding to $B_{Gk}$. Thus, $s_{Gk}$ and $r_{Gk}$ denote the scores and the rescores of $B_{Gk}$, respectively.

V denotes the logical OR while {x} denotes clipping of x in the range. Formally, $$\lfloor x \rceil = \begin{cases} 1, & x > 1 \\ x, & 0 \leq x \leq 1 \\ 0, & x < 0 \end{cases} \quad (1)$$

|s| denotes the number of elements in s. ◬ in the subscript denotes the lower triangular version of the matrix without the principal diagonal. ⊙ denotes the element-wise multiplication. I denotes the identity matrix.

NMS is one of the building blocks in 2D and 3D object detection whose high-level goal is to iteratively suppress boxes which have too much Intersection over Union (IoU) with a nearby high-scoring box. Classical NMS uses the idea that a box which has a high $IoU_{2D}$ overlap with any of the already selected boxes should be suppressed to zero. In other words, it uses a hard pruning function p without any temperature T. Soft-NMS makes this pruning soft using temperature T. Classical and Soft-NMS thus only differ in the choice of p. Algorithm 1 below set forth an example of classical/soft NMS.

---

Algorithm 1: Classical/Soft-NMS [6]
Input: s: scores, O: $IoU_{2D}$ matrix, $N_t$: NMS threshold,
p: pruning function, τ: temperature
Output: d: box index after NMS, r: scores after NMS

```
 1 begin
 2 |   d ← {}
 3 |   t ← range                                          ▸All box indices
   |   (|s|)
 4 |   r ← s
 5 |   while t ≠
 6 |   empty do   v ← argmax r[t]                         ▸Top scored box
 7 |   |          d ← d ∪ v                  ▸Add to valid box
   |   |                                     index
 8 |   |          t ← t − v                               ▸Remove from t
 9 |   |          for i ← 1 |t| do
10 |   |                    $r_i$ ← (1 − $p_τ$(O[v,i]))$r_i$    ▸Rescore
11 |   |          end
12 |   |
   |   |
   |   end
13 end
```

---

Classical NMS greedily calculates its rescores $r_i$ over the sorted set of boxes B and, is thus not parallelizable or differentiable. This disclosure aims to find a smooth approximation of the NMS in closed-form to include it in the training pipeline.

Figure 2:
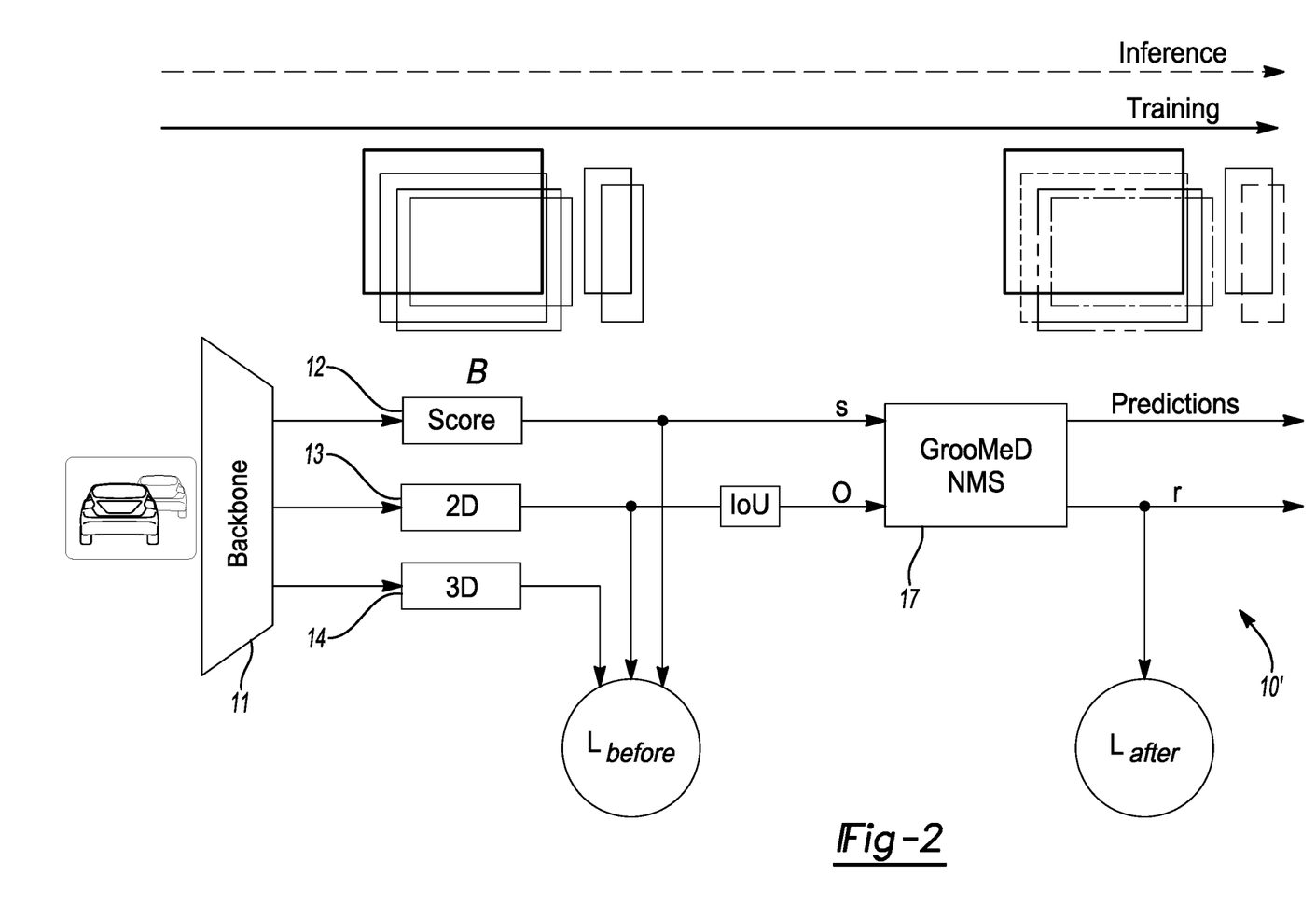
FIG. 2 is a diagram depicting the pipeline for an object detector which employs the proposed grouped mathematically differentiable NMS algorithm.

FIG. 2 depicts the pipeline for an object detector 10' that has been updated to include a grouped mathematically differentiable NMS module as indicated at 17. $L_{after}$ denoted the loss after NMS. The GrooMeD NMS module 17 calculates scores r in a differentiable manner giving useful gradients from $L_{after}$ when the best localized box corresponding to an object is not selected. In one embodiment, the rescores are calculated using a single layer neural network. The remaining components are the same as described above in relation to FIG. 1.

The rescoring process of the classical NMS is greedy set-based and only takes the overlap with unsuppressed boxes into account. One can generalize this into a matrix formulation by accounting for the effect of all (suppressed and unsuppressed) boxes as $$r_i = , \max\left(s_i - \sum_{j=1}^{i-1} p(o_{ij})r_j, 0\right) \quad (2)$$

using the relaxation of logical OR V operator as Σ. The presence of $r_j$ on the RHS of equation (2) prevents suppressed boxes from influencing other boxes hugely. When p outputs discretely as {0, 1} as in classical NMS, scores $s_i$ are guaranteed to be suppressed to $r_i=0$ or left unchanged $r_i=s_i$ thereby implying $r_i \leq s_i \forall i$. One can write the rescores r as $$\begin{bmatrix} r_1 \\ r_2 \\ r_3 \\ \vdots \\ r_n \end{bmatrix} = \max\left(\begin{bmatrix} c_1 \\ c_2 \\ c_3 \\ \vdots \\ c_n \end{bmatrix}, \begin{bmatrix} 0 \\ 0 \\ 0 \\ \vdots \\ 0 \end{bmatrix}\right) \text{ with} \quad (3)$$

$$\begin{bmatrix} c_1 \\ c_2 \\ c_3 \\ \vdots \\ c_n \end{bmatrix} = \begin{bmatrix} s_1 \\ s_2 \\ s_3 \\ \vdots \\ s_n \end{bmatrix} - \begin{bmatrix} 0 & 0 & \cdots & 0 \\ p(o_{21}) & 0 & \cdots & 0 \\ p(o_{31}) & p(o_{32}) & \cdots & 0 \\ \vdots & \vdots & \vdots & \vdots \\ p(o_{n1}) & p(o_{n2}) & \cdots & 0 \end{bmatrix} \begin{bmatrix} r_1 \\ r_2 \\ r_3 \\ \vdots \\ r_n \end{bmatrix} \quad (4)$$

The above two equations are written compactly as $$r = \max(s - Pr, 0), \quad (5)$$

where P, called the prune matrix, is obtained by elementwise operation of the pruning function p on O. Maximum operation makes equation (5) non-linear and, thus, difficult to solve. However, to avoid recursion, one can use $$r = \lfloor (I+P)^{-1} s \rceil \quad (6)$$

as the solution to equation (5) with I being the identity matrix. Intuitively, if the matrix inversion is considered division in equation (6) and the boxes have overlaps, the rescores are the scores divided by a number greater than one and are, therefore, lesser than scores. If the boxes do not overlap, the division is by one and rescores equal scores. Note that the I+P in equation (6) is a lower triangular matrix with ones on the principal diagonal. Hence, I+P is always full rank and, therefore, always invertible.

Next, observe that the object detectors output multiple boxes for an object in an image, and a good detector outputs boxes wherever it finds some objects in the monocular image. Therefore, the boxes in an image are clustered in an unsupervised manner based on $IoU_{2D}$ overlaps to obtain the groups G. Grouping thus mimics the grouping of classical NMS, but it does not rescore the boxes. Since clustering limits the interactions to intra-group interactions among the boxes, one can write equation (6) as $$r_{\mathcal{G}_k} = \lfloor (I_{\mathcal{G}_k} + P_{\mathcal{G}_k})^{-1} s_{\mathcal{G}_k} \rceil \quad (7)$$

Grouping hence helps in taking smaller matrix inverses in equation (7) compared to equation (6).

In one embodiment, a simplistic grouping algorithm is used where a group Gk is formed with boxes which have high $IoU_{2D}$ overlap with the top-ranked box. As the group size is limited by α, choose a minimum of a and the number of boxes in $G_k$. Next, delete all the boxes of this group and iterate until one runs out of boxes. Also, grouping uses $IoU_{2D}$ since one can achieve meaningful clustering in 2D. This unsupervised grouping method is set forth in Algorithm 3 below.

---
Algorithm 3: Grouping of boxes
Input: O: sorted $IoU_{2D}$ matrix, $N_t$: NMS threshold, x: group size
Output: G: Groups
---

| 1 | begin | | | |
|---|---|---|---|---|
| 2 | | G ← {} | | |
| 3 | | t ← range (O. shape [0]) | | ▶All box indices |
| 4 | | while t ≠ empty do | | |
| 5 | | | u ← O[:,0]> $N_t$ | ▶High overlap indices |
| 6 | | | v ← t[u] | ▶New group |
| 7 | | | $n_{Gk}$← min (∣v∣,a) | |
| 8 | | | G.insert (v[: $n_{Gk}$]) | ▶Insert new group |
| 9 | | | w ← O[:,0]≤ $N_t$ | ▶low overlap indices |
| 10 | | | t ← t[w] | ▶Keep w indices in w |
| 11 | | | O ← O[w][:,w] | ▶Keep w indices in O |
| 12 | | end | | |
| 13 | end | | | |

Other grouping methods are also contemplated with the broader aspects of this disclosure.

Classical NMS considers the $IoU_{2D}$ of the top-scored box with other boxes. This consideration is equivalent to only keep the column of O corresponding to the top box while assigning the rest of the columns to be zero. This is implemented through masking of $P_{Gk}$. Let $M_{Gk}$ denote the binary mask corresponding to group $G_k$. Then, only one of the columns in $M_{Gk} \odot P_{Gk}$ is non-zero. Thus, $I_{Gk} + M_{Gk} \odot P_{Gk}$ now becomes a Frobenius matrix (Gaussian transformation) and is, therefore, inverted by simply subtracting the second term. In other words, $(I_{Gk} + M_{Gk} \odot P_{Gk})^{-1} = I_{Gk} - M_{Gk} \odot P_{Gk}$. Hence, equation (7) is further simplified to $$r_{\mathcal{G}_k} = \lfloor (I_{\mathcal{G}_k} - M_{\mathcal{G}_k} \odot \mathcal{G}) s_{\mathcal{G}_k} \rceil \quad (8)$$

Thus, masking allows one to bypass the computationally expensive matrix inverse operation altogether.

Based on equation (8), an improved non-maximal suppression technique is presented in Algorithm 2.

---
Algorithm 2: GrooMeD-NMS
Input: s: scores, O: $IoU_{2D}$ matrix, $N_t$: NMS threshold, p: pruning function, v: valid box threshold, x: group size
Output: d: box index after NMS, r: scores after NMS
---

| 1 | begin | | |
|---|---|---|---|
| 2 | | S, index ←sort (s, descending = True) | ▶Sort s |
| 3 | | O←O[index][:, index] | ▶Sort O |
| 4 | | $O_A$← lower (O) | ▶Lower Δular matrix |
| 5 | | P ←p($O_A$) | ▶Prune matrix |
| 6 | | I ← Identity (∣s∣) | ▶Identity matrix |
| 7 | | G ← group (O, $N_t$, x) | ▶Group boxes B |
| 8 | | for k ←1: ∣G∣ do | |

-continued

```
Algorithm 2: GrooMeD-NMS
Input: s: scores, O: IoU_{2D} matrix, N_t: NMS threshold,
      p: pruning function, v: valid box threshold, x:
                    group size
Output: d: box index after NMS, r: scores after NMS
```

| | | | |
|---|---|---|---|
| 9  | |  $M_{Gk} \leftarrow zeros(|G_K|,|G_K|)$ | ▶Prepare mask |
| 10 | |  $M_{Gk}[:, G_K[0]] \leftarrow 1$ | ▶First col of $M_{Gk}$ |
| 11 | |  $r_{Gk} \leftarrow \lfloor (1_{Gk} - M_{Gk} \odot P_{Gk})s_{Gk} \rfloor$ | ▶Rescore |
| 12 | | | |
| | end | | |
| 13 | $d \leftarrow index\{r > = v\}$ | | ▶Valid box index |
| 14 end | | | |

This technique is referred to herein as Grouped Mathematically Differentiable Non-Maximal Suppression or GrooMeD-NMS.

Figure 3:
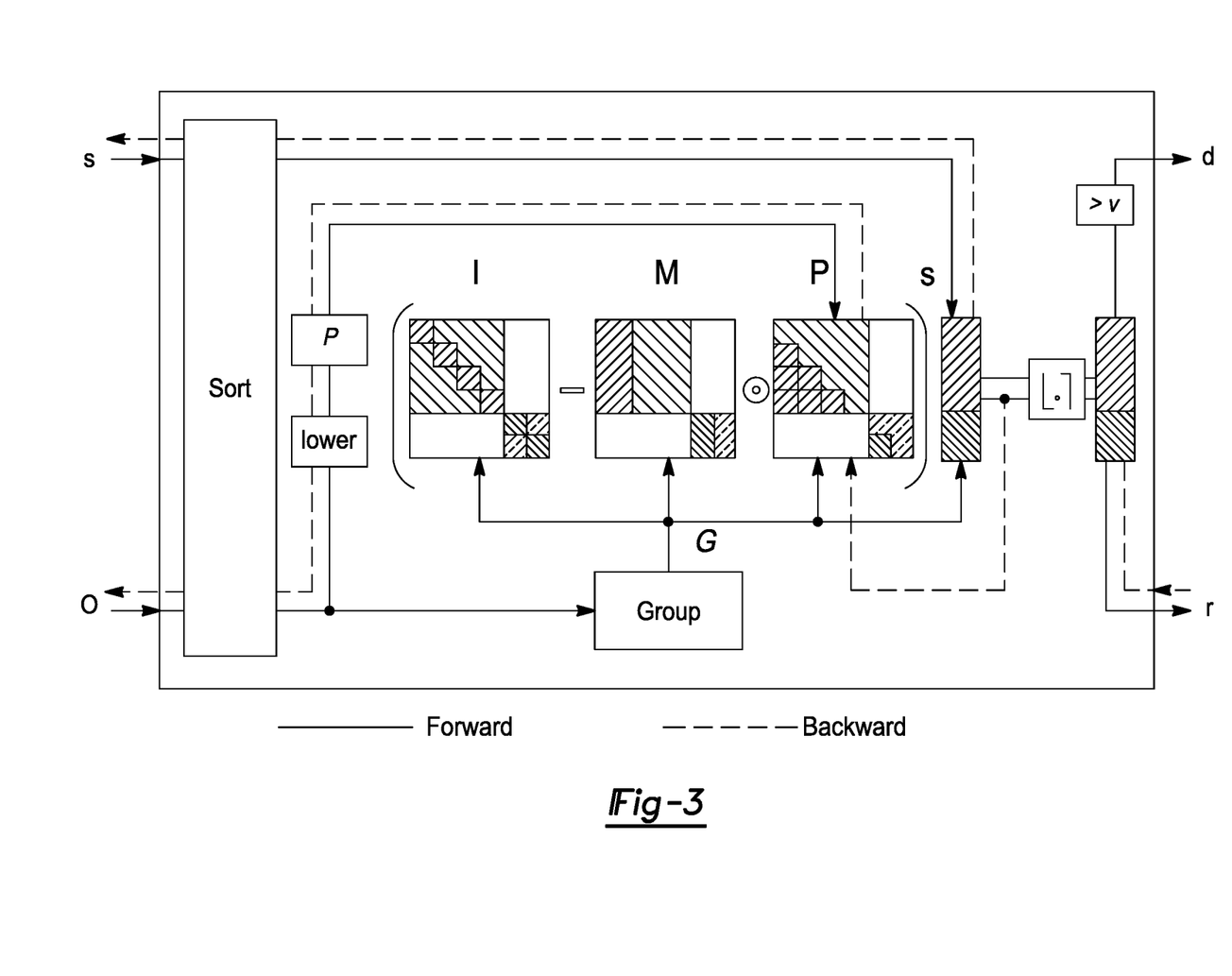
FIG. 3 is a diagram showing the gradients through the grouped mathematically differentiable NMS module.

FIG. 3 shows the gradients through the grouped mathematically differentiable NMS module 17. The NMS expression (8) above is based on matrix operations such as multiplication, subtraction and clipping (which are differentiable), and therefore, getting the gradients is straight-forward. An automatic differentiation library, such as Pytorch, automatically calculates the gradient with respect to both the inputs to the NMS—the scores and the overlaps. The dotted lines show the flow of the gradient through the GrooMeD-NMS.

As explained above, the pruning function p decides whether to keep the box in the final set of predictions D or not based on $IoU_{2D}$ overlaps. In other words, $p(o_i)=1$ denotes the box bi is suppressed while $p(o_i)=0$ denotes bi is kept in D.

Figure 4:
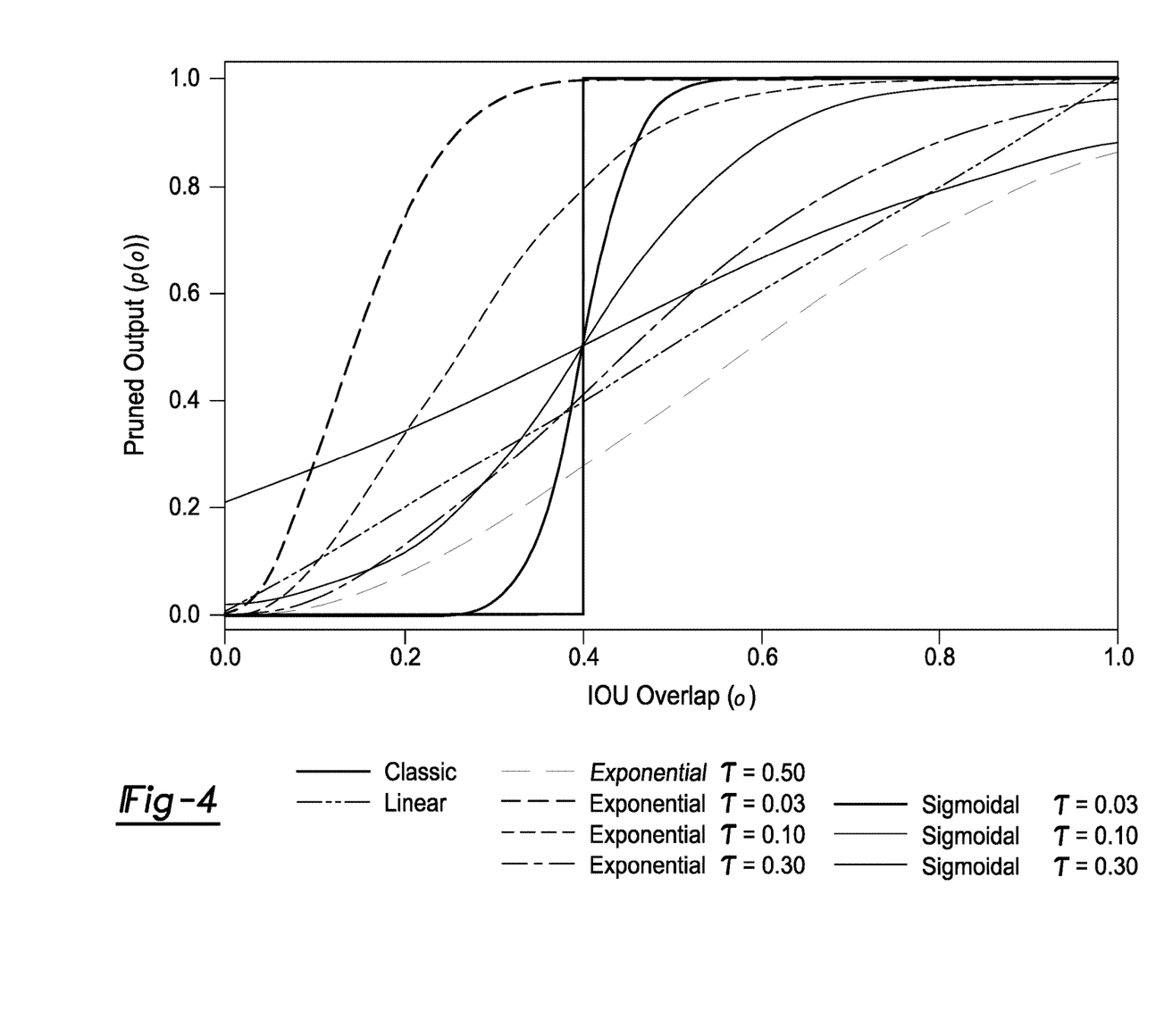
FIG. 4 is a graph showing pruning functions of classical and the proposed grouped mathematically differentiable NMS algorithms.

Classical NMS uses the threshold as the pruning function, which does not give useful gradients. This disclosure considered three different functions for p: linear, a temperature (T)-controlled exponential, and a sigmoidal function. The linear pruning function is $p(o)=o$. The exponential pruning function is $p(o)=1-\exp(-o^2/T)$. The sigmoidal pruning function is $p(o)=\sigma(o-N_t/T)$ with $\sigma$ denoting the standard sigmoid. Sigmoidal function appears as the binary cross entropy relaxation of the subset selection problem. A comparison of these pruning functions is shown in FIG. 4. The ablation studies show that choosing p as Linear yields the simplest and the best GrooMeD-NMS.

GrooMeD-NMS does soft pruning to get r but uses hard sorting of s and O (lines 2-3 of Algorithm 2). Permutation of o are needed to sort O. Most soft sorting methods apply the soft permutation to the same vector. Two known methods can apply the soft permutation to another vector: Vert. "Differentiable ranks and sorting using optimal transport" described by Cuturi et al in In NeurIPS, 2019; and "Softsort: A continuous relaxation for the argsort operator" described by Prillo et. al. in In ICML, 2020. Both these methods use O(n2) computations for soft sorting. In this disclosure, it was found out that these methods are overly dependent on temperature T to break out the ranks, and its gradients were too unreliable to train the model. Hence, GrooMeD-NMS preferably employs hard sorting of s and O although soft sorting may be suitable in some embodiments.

Although no NMS has been proposed for the monocular 3D object detection, GrooMeD-NMS is compared with the NMS proposed for 2D object detection, 2D pedestrian detection, and 2D salient object detection in Table 1. No method described in Table 1 has a matrix-based closed-form mathematical expression of the NMS. Classical and Soft-NMS are used at the inference time, while GrooMeD-NMS is used during both training and inference. QUBO-NMS, Point-NMS, and MAP-NMS are not used in end-to-end training. The Structured-SVM based NMS rely on structured SVM to obtain the rescores. The neural network based NMS (denoted by NN-NMS) uses a separate neural network containing multiple layers and/or message-passing to approximate the NMS and does not use the pruning function. Unlike these methods, GrooMeD-NMS uses a single layer and does not require multiple layers or message passing. The algorithm is parallel upto group (denoted by G). However, |G| is, in general, <<|B| in the NMS.

Figure 5:
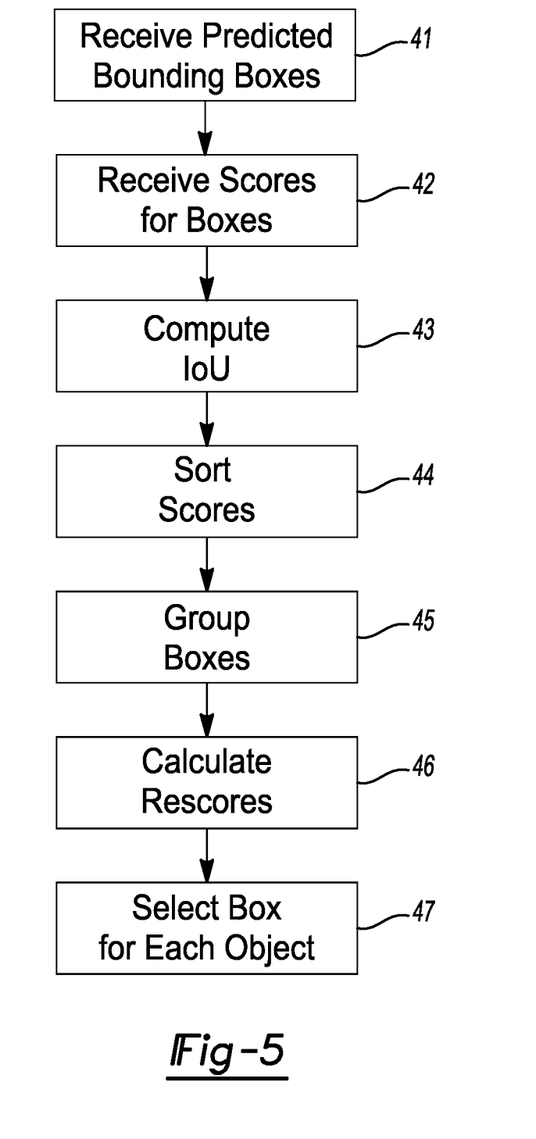
FIG. 5 is a flowchart depicting an example technique for detecting objects using the grouped mathematically differentiable NMS.

FIG. 5 depicts an example technique for detecting object in an image using grouped mathematically differentiable NMS. A set of predicted bounding boxes is received at 41 from one or both of the two-dimensional classification head and the three-dimensional classification head. Scores for each of the predicted bounding boxes in the set of predicted bounding boxes is also received at 42 from the scoring head. It is noted that the scores for the predicted bounding boxes are in the form of a vector.

Next, a set of IoU measures are computed at 43 for the set of predicted bounding boxes.

Boxes in the set of predicted bounding boxes are then grouped at 45 into one or more groups of predicted bounding boxes. In an example embodiment, groups of boxes are formed with boxes having the highest overlap with a top-ranked box. That is, boxes are grouped by identifying a box with highest score in the set of predicted bounding boxes; grouping boxes from the set of predicted bounding boxes with highest overlap with the identified box into a given group; deleting boxes in the given group from the set of predicted bounding boxes; and reiterating these steps until there are no boxes in the set of predicted bounding boxes. Other grouping techniques also fall within the broader aspects of this disclosure.

Prior to grouping the boxes, scores for each of the predicted bounding boxes in the set of predicted bounding boxes are sorted at 44 in a descending order. The IoU measures in the set of IoU measures are also sorted using permutation of the scores for each of the predicted bounding boxes.

For each group in the one or more groups of predicted bounding boxes, rescores are calculated at 46 for each of the predicted bounding boxes in the set of predicted bounding boxes by performing matrix operations on the vector of scores in accordance with a closed-form expression, for example as set forth above in equation (7).

Lastly, a box is selected at 47 for each object in the image using the rescore for each of the predicted bounding boxes. In one embodiment, a subset of boxes are selected for each object. Selected boxes have a rescore which exceeds a threshold for valid boxes. The threshold is preferably derived empirically. If more than one box has a rescore which exceeds the threshold, then all those boxes are kept.

The technique for detecting objects in image data is suitable for use in many different applications. In one example, the image data represents a scene and the selected boxes are indicative of objects in the scene. Image data for the scene may be captured using a camera or an imaging device and then serve as input to a computer processor. Based on the selected boxes, a controlled object, such a robot, medical device or an autonomous vehicle, is navigated through the scene. Techniques for plotting a path and issuing commands to the controlled object in accordance with the path are readily known in the art.

Grouped mathematically differentiable NMS consists of M3D-RPN and uses binning and self-balancing confidence. The boxes' self-balancing confidence are used as scores s and these are passed through the GrooMeD-NMS layer to obtain their rescores r. The rescores are used to signal the network if the best box has not been selected for a particular object.

The notion of the best 2D box can be extended to 3D. The best box has the highest product of $IoU_{2D}$ and $gIoU_{3D}$ with ground truth $g_l$, and the product is greater than a certain threshold and is assigned a positive label. Mathematically, $$\text{target}(b_i) = \begin{cases} 1, & \text{if } \exists \ gl \ st \ i = \text{argmax } q(b_j, gl) \\ & \text{and } q(b_i, gl) \geq \beta \\ 0, & \text{otherwise} \end{cases} \quad (9)$$

with $q(b_j, g_l) = IoU_{2D}(b_j; g_l)(1 + gIoU_{3D}(b_j; g_l)/2)$. $gIoU_{2D}$ is known to provide signal even for non-intersecting boxes, where the usual $IoU_{2D}$ is always zero. Therefore, one can use $gIoU_{3D}$ instead of regular $IoU_{3D}$ for figuring out the best box in 3D as many boxes in 3D have a zero $IoU_{3D}$ overlap with the ground truth. For calculating $gIoU_{3D}$, first calculate the volume V and hull volume $V_{hull}$ of the 3D boxes. $V_{hull}$ is the product of $gIoU_{2D}$ in Birds Eye View (BEV), removing the rotations and hull of the Y dimension. $gIoU_{3D}$ is then given by $$gIoU_{3D}(b_i, b_j) = \frac{V(b_i \cap b_j)}{V(b_i \cup b_j)} + \frac{V(b_i \cap b_j)}{V_{hull}(b_i \cup b_j)} - 1. \quad (10)$$

In general, the number of best boxes is less than the number of ground truths in an image (there could be some ground boxes for which no box is predicted). The tiny number of best boxes introduces a far-heavier skew than the foreground-background classification. Therefore, one can use the modified AP-Loss as the loss after NMS since AP-Loss does not suffer from class imbalance.

Vanilla AP-Loss treats boxes of all images in a minibatch equally, and the gradients are back-propagated through all the boxes. Remove this condition and rank boxes in an image-wise manner. In other words, if the best boxes are correctly ranked in one image and are not in the second, then the gradients only affect the boxes of the second image. Call this modification as Imagewise APLoss. In other words, $$\mathcal{L}_{imagewise} = \frac{1}{N}\sum_{m=1}^{N} AP(r^{(m)}, \text{target}(\mathcal{B}^{(m)})), \quad (11)$$

where $r^{(m)}$ and $B^{(m)}$ denote the rescores and the boxes of the $m^{th}$ image in a mini-batch respectively. This is different from previous NMS approaches, which use classification losses. Ablation studies show that the Imagewise AP-Loss is better suited to be used after NMS than the classification loss.

The overall loss function is thus given by $L = L_{before} + \lambda L_{after}$ where $L_{before}$ denotes the losses before the NMS including classification, 2D and 3D regression as well as confidence losses, and $L_{after}$ denotes the loss term after the NMS is the Imagewise AP-Loss with $\lambda$ being the weight.

Experiments were conducted using the most widely used KITTI autonomous driving dataset. The publicly available PyTorch code of Kinematic-3D was modified. Kinematic-3D used DenseNet-121 trained on Imagenet as the backbone and $n_h$=1024 using 3D-RPN settings. Kinematic-3D is a video-based method while GrooMeD-NMS is an image based method; this disclosure uses the best image model of Kinematic-3D henceforth called Kinematic (Image) as the baseline for a fair comparison. Kinematic (Image) is built on M3D-RPN and uses binning and self-balancing confidence.

Training images are augmented using random flipping with probability 0.5. Adam optimizer is used with batch size 2, weight-decay $5\times10^{-4}$ and gradient clipping of 1. Training is done in two stages—warmup and full. Warmup takes 80 k mini-batches and starts with a learning rate $4\times10^{-3}$ following a poly learning policy with power 0.9. Then initialize the model with the confidence prediction branch from warmup weights and fine tune for 50 k mini-batches using the self-balancing loss and Imagewise AP-Loss after GrooMeD-NMS. The weight $\lambda$ is kept at 0:05. Unless otherwise stated, use p as the Linear function (this does not require T) with $\alpha$=100. $N_r$; v and B are set to 0.4; 0.3 and 0.3, respectively.

For inference, multiply the class and predicted confidence to get the box's overall score in inference.

There are three commonly used data splits of the KITTI dataset. The grouped mathematically differentiable NMS approach is evaluated on all three datasets: Test Split, Val 1 Split and Val 2 Split. Test Split: Official KITTI 3D benchmark consists of 7,481 training and 7,518 testing images. Val 1 Split—partitions the 7,481 training images into 3,712 training and 3,769 validation images. Val 2 Split—partitions the 7,481 training images into 3,682 training and 3,799 validation images.

KITTI uses $AP_{3D|R40}$ metric to evaluate object detection. KITTI evaluation is done on three object categories: easy, moderate and hard. Each object is assigned to a category based on its occlusion, truncation, and height in the image space. The $AP_{3D|R40}$ performance on the Moderate category compares different models in the benchmark. Experiments focused on the car class.

Table 2 summarizes the results of 3D object detection and BEV evaluation on KITTI Test Split. The results in Table 2 show that GrooMeD-NMS outperforms the baseline M3D-RPN by a significant margin and several other SoTA methods on both the tasks. GrooMeD-NMS also outperforms augmentation based approach GAD and depth-convolution based D4LCN. Despite being an image-based method, GrooMeD-NMS performs competitively to the video-based method Kinematic (Video), outperforming it on the most-challenging Hard set.

Table 3 summarizes the results of 3D object detection and BEV evaluation on KITTI Val 1 Split at two $IoU_{3D}$ thresholds of 0.7 and 0.5. The results in Table 3 show that GrooMeD-NMS outperforms the baseline of M3D-RPN and Kinematic (Image) by a significant margin. Interestingly, GrooMeD-NMS (an image-based method) also outperforms the video-based method Kinematic (Video) on most of the metrics. Thus, GrooMeDNMS performs best on 6 out of the 12 cases (3 categories×2 tasks×2 thresholds) while second-best on all other cases. The performance is especially impressive because the biggest improvements are shown on the Moderate and Hard set, where objects are more distant and occluded.

Figure 6A:
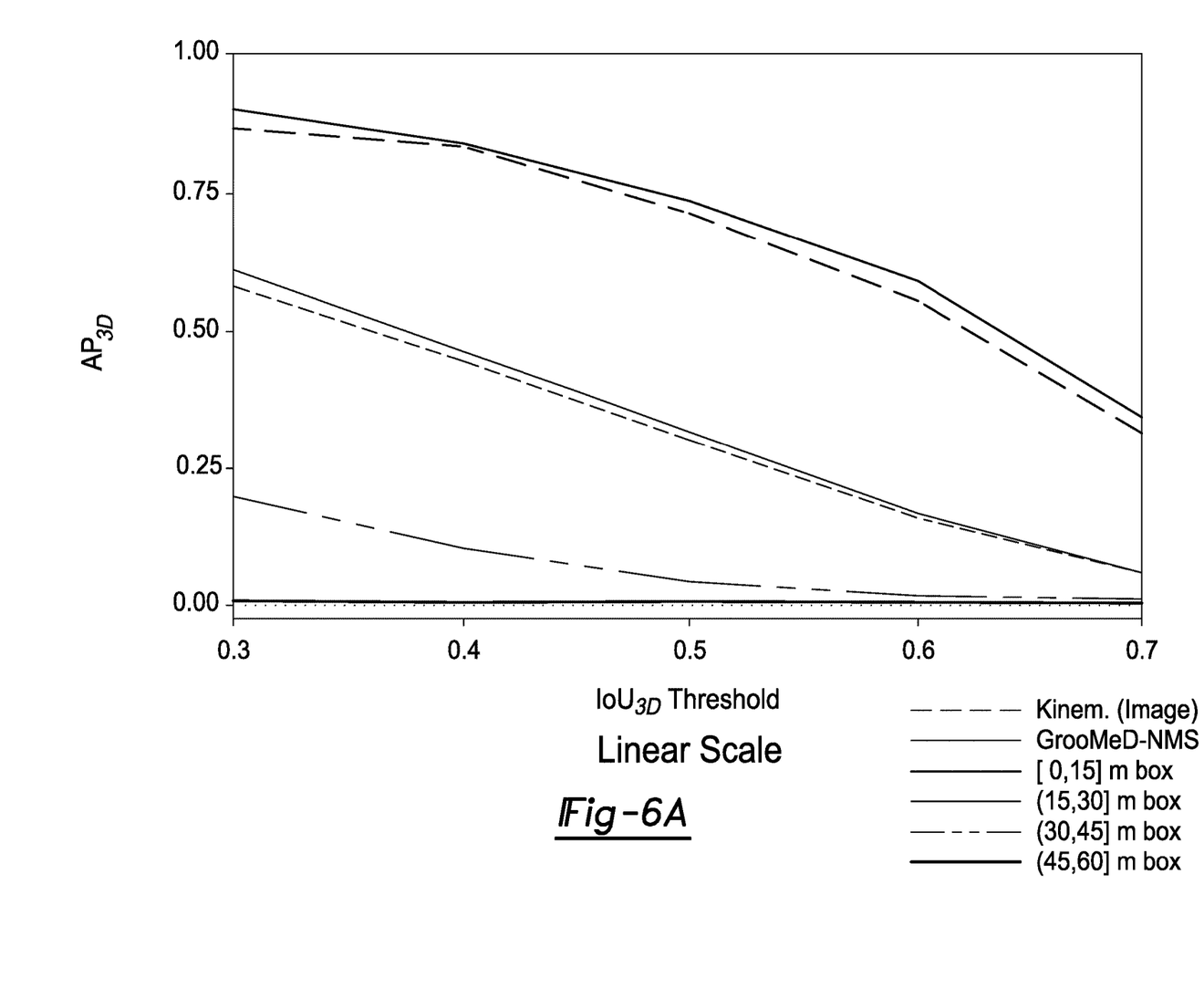
FIGS. 6A and 6B are graphs comparing AP3D at different depths and IoU matching thresholds on KITTI Val 1 Split in a linear scale and log scale, respectively.
Figure 6B:
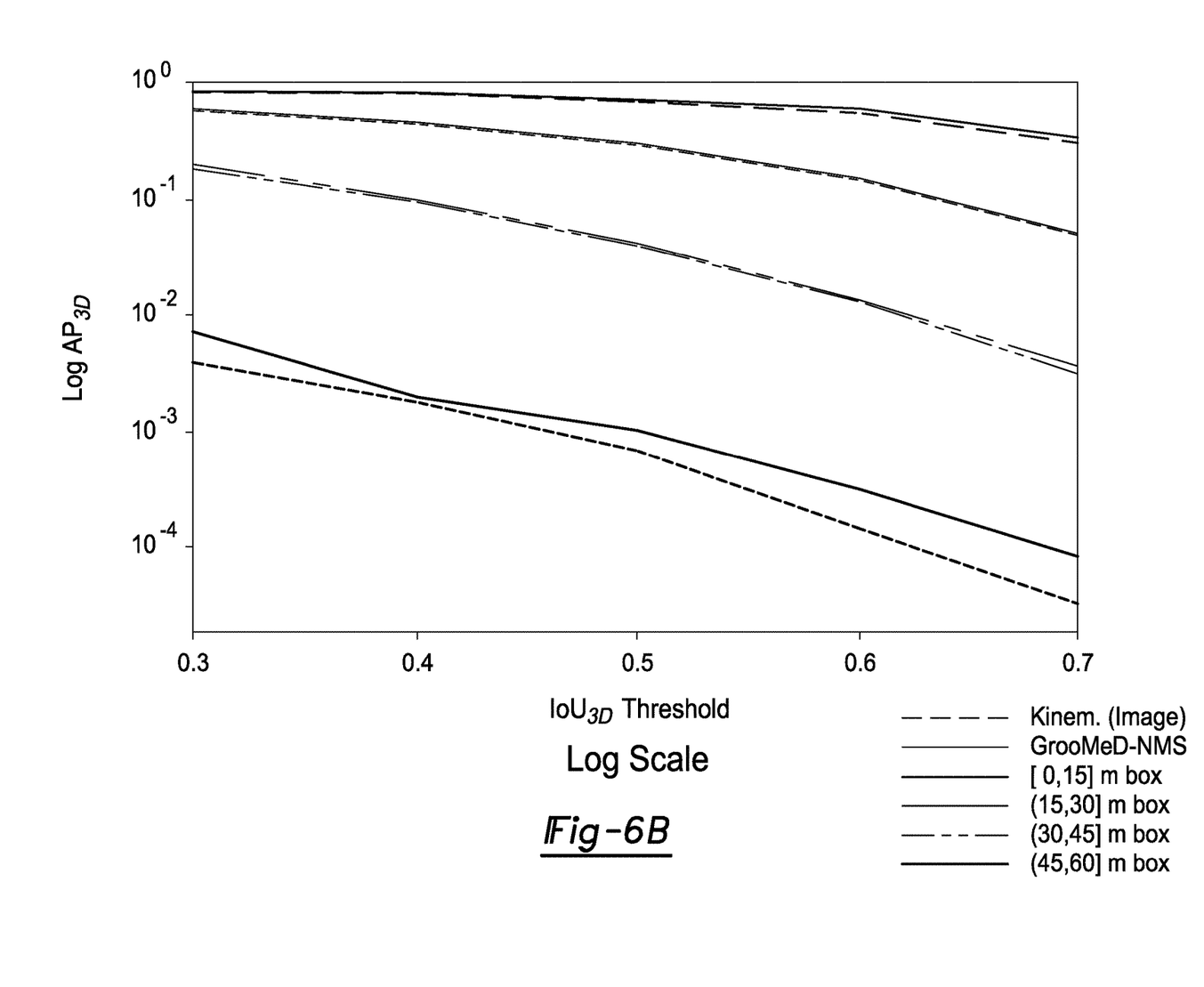

Next, the $AP_{3D}$ performance of GrooMeDNMS and Kinematic (Image) were compared on linear and log scale for objects at different depths of meters and $IoU_{3D}$ matching criteria of 0.3→0.7 in FIGS. 6A and 6B. FIGS. 6A and 6B show that GrooMeD-NMS outperforms the Kinematic (Image) at all depths and all $IoU_{3D}$ thresholds.

GrooMeDNMS technique was also compared with the other inference-based NMS-classical and Soft-NMS techniques as shown in Table 4. The results show that NMS inclusion in the training pipeline benefits the performance. Training with GrooMeD-NMS helps because the network gets an additional signal through the GrooMeD-NMS layer whenever the best-localized box corresponding to an object is not selected. Interestingly, Table 4 also suggests that replacing GrooMeD-NMS with the classical NMS in inference does not affect the performance.

Figure 7:
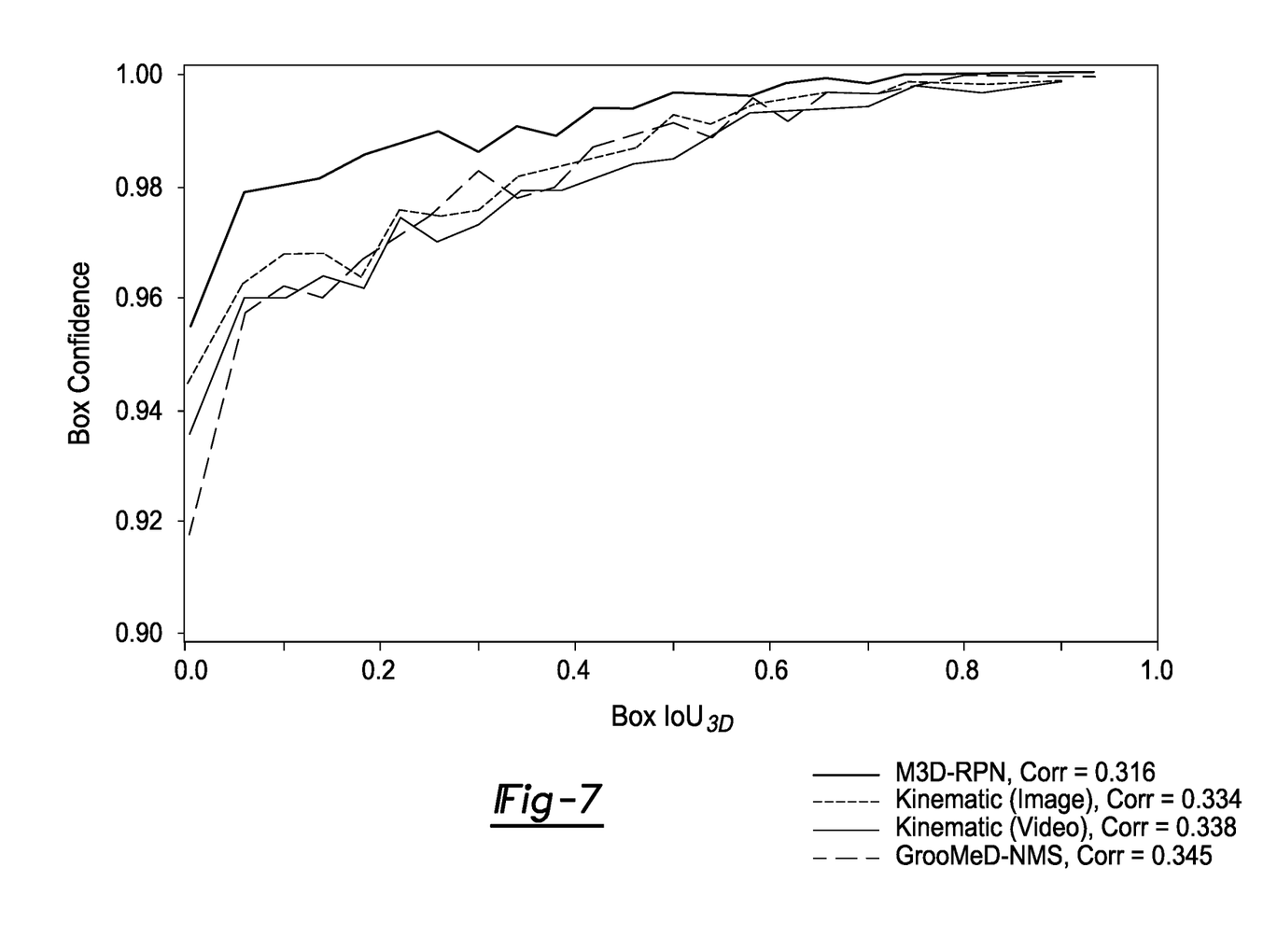
FIG. 7 is a graph plotting scores with IoU after NMS.

The scores are further correlated with $IoU_{3D}$ after NMS of the model with two baselines—M3D-RPN and Kinematic (Image) and also the Kinematic (Video) in FIG. 7. The best correlation of 0.345 exceeded the correlations of M3D-RPN, Kinematic (Image) and, also Kinematic (Video). This proves that including NMS in the training pipeline is beneficial.

Lastly, the training and inference times of including GrooMeDNMS in the pipeline were compared. Warmup takes about 13 hours to train on a single 12 GB GeForce GTX Titan-X GPU. Full of Kinematic (Image) and GrooMeD-NMS takes about 8 and 8.5 hours, respectively. The inference time per image using classical and GrooMeD-NMS is 0.12 and 0.14 ms respectively. Table 4 suggests that changing the NMS from GrooMeD to classical during inference does not alter the performance. Then, the inference time of our method is the same as 0.12 ms.

Table 5 summarizes the results of 3D object detection and BEV evaluation on KITTI Val 2 Split at two $IoU_{3D}$ thresholds of 0.7 and 0.5. Again, M3D-RPN and Kinematic (Image) are used as baselines. The released model of M3D-RPN is evaluated using the KITTI metric. The results in Table 5 show that GrooMeD-NMS performs best in all cases. This is again impressive because the improvements are shown on Moderate and Hard set, consistent with Table 2 and 3.

Table 6 compares the modifications of this approach on KITTI Val 1 Cars. Using a confidence head (Conf+No NMS) proves beneficial compared to the warmup model (No Conf+No NMS). Moreover, GrooMeD-NMS on classification scores (denoted by No Conf+NMS) is detrimental as the classification scores are not suited for localization. Training the warmup model and then fine tuning also works better than training without warmup since the warmup phase allows the GrooMeD-NMS to carry meaningful grouping of the boxes. In addition to Linear, two other functions for p were compared: Exponential and Sigmoidal. Exponential and Sigmoidal do not perform as well as the Linear p possibly because they have vanishing gradients close to overlap of zero or one. Grouping and masking both help the model to reach a better minimum. Imagewise AP loss is better than the Vanilla AP loss since it treats boxes of two images differently. Imagewise AP also performs better than the binary cross-entropy (BCE) loss. Class confidence does not work better since it does not have the localization information while the self-balancing confidence gives the localization information without consideration of whether the box belongs to foreground or background.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

APPENDIX

TABLE 1

Overview of NMS algorithms. [Key: Train = End-to-end Trainable, L = Number of layers, Prune = Pruning function, Par = Parallelizable]

| Algorithm | Train | Rescore | L | Prune | Par |
|---|---|---|---|---|---|
| Classical | X | X | — | Hard | $O(|G|)$ |
| Soft-NMS | X | X | — | Soft | $O(|G|)$ |
| QUBO-NMS | X | Optimization | — | X | — |
| Point-NMS | X | Point Process | — | X | — |
| MAP-NMS | X | MAP | — | X | — |
| Structured-NMS | ✓ | SSVM | — | X | $O(|1|)$ |
| NN-NMS | ✓ | Neural Net | >1 | X | $O(|1|)$ |
| GrooMeD-NMS | ✓ | Matrix | 1 | Soft | $O(|G|)$ |

TABLE 2

$AP_{3D|R_{40}}$ and $AP_{BEV|R_{40}}$ comparison on the KITTI Test Cars ($IoU_{3D} \geq 0.7$). Previous results are quoted from the official leader-board [Key: Best, Second Best].

| | $AP_{3D|R_{40}}$ (↑) | | | $AP_{BEV|R_{40}}$ (↑) | | |
|---|---|---|---|---|---|---|
| | Easy | Mod | Hard | Easy | Mod | Hard |
| FQNet | 2.77 | 1.51 | 1.01 | 5.40 | 3.23 | 2.46 |
| ROI-10D | 4.32 | 2.02 | 1.46 | 9.78 | 4.91 | 3.74 |
| GS3D | 4.47 | 2.90 | 2.47 | 8.41 | 6.08 | 4.94 |
| MonoGRNet | 9.61 | 5.74 | 4.25 | 18.19 | 11.17 | 8.73 |
| MonoPSR | 10.76 | 7.25 | 5.85 | 18.33 | 12.58 | 9.91 |
| MonoDIS | 10.37 | 7.94 | 6.40 | 17.23 | 13.19 | 11.12 |
| M3D-RPN | 14.76 | 9.71 | 7.42 | 21.02 | 13.67 | 10.23 |
| SMOKE | 14.03 | 9.76 | 7.84 | 20.83 | 14.49 | 12.75 |
| MonoPair | 13.04 | 9.99 | 8.65 | 19.28 | 14.83 | 12.89 |
| RTM3D | 14.41 | 10.34 | 8.77 | 19.17 | 14.20 | 11.99 |
| AM3D | 16.50 | 10.74 | 9.52 | 25.03 | 17.32 | 14.91 |
| GAD | 15.19 | 10.90 | 9.26 | 22.76 | 17.03 | 10.86 |
| D4LCN | 16.65 | 11.72 | 9.51 | 22.51 | 16.02 | 12.55 |
| Kinematic (Video) | 19.07 | 12.72 | 9.17 | 26.69 | 17.52 | 13.10 |
| GrooMeD-NMS | 18.10 | 12.32 | 9.65 | 26.19 | 18.27 | 14.05 |

TABLE 3

$AP_{3D|R_{40}}$ and $AP_{BEV|R_{40}}$ comparisons on KITTI Val 1 Cars. [Key: Best, Second Best].

| | $IoU_{3D} \geq 0.7$ | | | | | | $IoU_{3D} \geq 0.5$ | | | | | |
|---|---|---|---|---|---|---|---|---|---|---|---|---|
| | $AP_{3D|R_{40}}$ (↑) | | | $AP_{BEV|R_{40}}$ (↑) | | | $AP_{3D|R_{40}}$ (↑) | | | $AP_{BEV|R_{40}}$ (↑) | | |
| | Easy | Mod | Hard | Easy | Mod | Hard | Easy | Mod | Hard | Easy | Mod | Hard |
| MonoDIS | 11.06 | 7.06 | 6.37 | 18.45 | 12.58 | 10.66 | — | — | — | — | — | — |
| MonoGRNet | 11.90 | 7.56 | 5.76 | 19.72 | 12.81 | 10.15 | 47.59 | 32.28 | 25.50 | 52.13 | 35.99 | 28.72 |
| M3D-RPN | 14.53 | 11.07 | 8.65 | 20.85 | 15.62 | 11.88 | 48.56 | 35.94 | 28.59 | 53.35 | 39.60 | 31.77 |
| GAD | 14.28 | 11.13 | 9.68 | 22.36 | 17.87 | 15.73 | — | — | — | — | — | — |
| MonoPair | 16.28 | 12.30 | 10.42 | 24.12 | 18.17 | 15.76 | 55.38 | 42.39 | 37.99 | 61.06 | 47.63 | 41.92 |
| Kinematic (Image) | 18.28 | 13.55 | 10.13 | 25.72 | 18.82 | 14.48 | 54.70 | 39.33 | 31.25 | 60.87 | 44.36 | 34.48 |
| Kinematic (Video) | 19.76 | 14.10 | 10.47 | 27.83 | 19.72 | 15.10 | 55.44 | 39.47 | 31.26 | 61.79 | 44.68 | 34.56 |
| GrooMeD-NMS | 19.67 | 14.32 | 11.27 | 27.38 | 19.75 | 15.92 | 55.62 | 41.07 | 32.89 | 61.83 | 44.98 | 36.29 |

TABLE 4

$AP_{3D|R_{40}}$ (↑) and $AP_{BEV|R40}$ comparisons with inference-Based NMS algorithms on KITTI Val 1 Cars($IoU_{3D} \geq 0.7$). [Key: C = Classical, S = Soft-NMS, G = GrooMeD-NMS]

| | Infer NMS | $AP_{3D|R_{40}}$ (↑) | | | $AP_{BEV|R_{40}}$ (↑) | | |
|---|---|---|---|---|---|---|---|
| | | Easy | Mod | Hard | Easy | Mod | Hard |
| Kinematic (Image) | C | 18.28 | 13.55 | 10.13 | 25.72 | 18.82 | 14.48 |
| Kinematic (Image) | S | 18.29 | 13.55 | 10.13 | 25.71 | 18.81 | 14.48 |
| Kinematic (Image) | G | 18.26 | 13.51 | 10.10 | 25.67 | 18.77 | 14.44 |

TABLE 4-continued $AP_{3D|R40}$ (↑) and $AP_{BEV|R40}$ comparisons with inference-Based NMS algorithms on KITTI Val 1 Cars(IoU$_{3D}$ ≥ 0.7). [Key: C = Classical, S = Soft-NMS, G = GrooMeD-NMS]

| | Infer NMS | $AP_{3D|R40}$ (↑) | | | $AP_{BEV|R40}$ (↑) | | |
|---|---|---|---|---|---|---|---|
| | | Easy | Mod | Hard | Easy | Mod | Hard |
| GrooMeD-NMS | C | 19.67 | 14.31 | 11.27 | 27.38 | 19.75 | 15.93 |
| GrooMeD-NMS | S | 19.67 | 14.31 | 11.27 | 27.38 | 19.75 | 15.93 |
| GrooMeD-NMS | G | 19.67 | 14.32 | 11.27 | 27.38 | 19.75 | 15.92 |

TABLE 5

$AP_{3D|R40}$ and $AP_{BEV|R40}$ comparisons on KITTI Val 2 Cars. [Key: Best, * = Released, = Retrained]

| | IoU$_{3D}$ ≥ 0.7 | | | | | | IoU$_{3D}$ ≥ 0.5 | | | | | |
|---|---|---|---|---|---|---|---|---|---|---|---|---|
| | $AP_{3D|R40}$ (↑) | | | $AP_{BEV|R40}$ (↑) | | | $AP_{3D|R40}$ (↑) | | | $AP_{BEV|R40}$ (↑) | | |
| | Easy | Mod | Hard | Easy | Mod | Hard | Easy | Mod | Hard | Easy | Mod | Hard |
| M3D-RPN [7]* | 14.57 | 10.07 | 7.51 | 21.36 | 15.22 | 11.28 | 49.14 | 34.43 | 26.39 | 53.44 | 37.79 | 29.36 |
| Kinematic (Image) [8] | 13.54 | 10.21 | 7.24 | 20.60 | 15.14 | 11.30 | 51.53 | 36.55 | 28.26 | 56.20 | 40.02 | 31.25 |
| GrooMeD-NMS (Ours) | 14.72 | 10.87 | 7.67 | 22.03 | 16.05 | 11.93 | 51.91 | 36.78 | 28.40 | 56.29 | 40.31 | 31.39 |

TABLE 6

Ablation studies of our method on KITTI Val 1 Cars.

| Change from GrooMeD-NMS model | | IoU$_{3D}$ ≥ 0.7 | | | | | | IoU$_{3D}$ ≥ 0.5 | | | | | |
|---|---|---|---|---|---|---|---|---|---|---|---|---|---|
| | | $AP_{3D|R40}$ (↑) | | | $AP_{BEV|R40}$ (↑) | | | $AP_{3D|R40}$ (↑) | | | $AP_{BEV|R40}$ (↑) | | |
| Changed | From →To | Easy | Mod | Hard | Easy | Mod | Hard | Easy | Mod | Hard | Easy | Mod | Hard |
| Training | Conf + NMS → No Conf + No NMS | 16.66 | 12.10 | 9.40 | 23.15 | 17.43 | 13.48 | 51.47 | 38.58 | 30.98 | 56.48 | 42.53 | 34.37 |
| | Conf + NMS → Conf + No NMS | 19.16 | 13.89 | 10.96 | 27.01 | 19.33 | 14.84 | 57.12 | 41.07 | 32.79 | 57.12 | 41.07 | 32.79 |
| | Conf + NMS →No Conf + NMS | 15.02 | 11.21 | 8.83 | 21.07 | 16.27 | 12.77 | 48.01 | 36.18 | 29.96 | 53.82 | 40.94 | 33.35 |
| Initialization | No Warmup | 15.33 | 11.68 | 8.78 | 21.32 | 16.59 | 12.93 | 49.15 | 37.42 | 30.11 | 54.32 | 41.44 | 33.48 |
| Pruning Function | Linear → Exponential, τ = 1 | 12.81 | 9.26 | 7.10 | 17.07 | 12.17 | 9.25 | 29.58 | 20.42 | 15.88 | 32.06 | 22.16 | 17.20 |
| | Linear → Exponential, τ = 0.5 [6] | 18.63 | 13.85 | 10.98 | 27.52 | 20.14 | 15.76 | 56.64 | 41.01 | 32.79 | 61.43 | 44.73 | 36.02 |
| | Linear → Exponential, τ = 0.1 | 18.34 | 13.79 | 10.88 | 27.26 | 19.71 | 15.90 | 56.98 | 41.16 | 32.96 | 62.77 | 45.23 | 36.56 |
| | Linear → Sigmoidal, τ = 0.1 | 17.40 | 13.21 | 9.80 | 26.77 | 19.26 | 14.76 | 55.15 | 40.77 | 32.63 | 60.56 | 44.23 | 35.74 |
| Group + Mask | Group + Mask → No Group | 18.43 | 13.91 | 11.08 | 26.53 | 19.46 | 15.83 | 55.93 | 40.98 | 32.78 | 61.02 | 44.77 | 36.09 |
| | Group + Mask → Group + No Mask | 18.99 | 13.74 | 10.24 | 26.71 | 19.21 | 14.77 | 55.21 | 40.69 | 32.55 | 61.74 | 44.67 | 36.00 |
| Loss | Imagewise AP → Vanilla AP | 18.23 | 13.73 | 10.28 | 26.42 | 19.31 | 14.76 | 54.47 | 40.35 | 32.20 | 60.90 | 44.08 | 35.47 |
| | Imagewise AP → BCE | 16.34 | 12.74 | 9.73 | 22.40 | 17.46 | 13.70 | 52.46 | 39.40 | 31.68 | 58.22 | 43.60 | 35.27 |
| Inference NMS Scores | Class*Pred →Class | 18.26 | 13.36 | 10.49 | 25.39 | 18.64 | 15.12 | 52.44 | 38.99 | 31.3 | 57.37 | 42.89 | 34.68 |
| | Class*Pred →Pred | 17.51 | 12.84 | 9.55 | 24.55 | 17.85 | 13.63 | 52.78 | 37.48 | 29.37 | 58.30 | 41.26 | 32.66 |
| — | GrooMeD-NMS (best model) | 19.67 | 14.32 | 11.27 | 27.38 | 19.75 | 15.92 | 55.62 | 41.07 | 32.89 | 61.83 | 44.98 | 36.29 |

What is claimed is:

1. A computer-implemented method for detecting objects in an image, comprising:
   receiving, by a computer processor, a set of predicted bounding boxes from at least one of a two-dimensional classification head or a three-dimensional classification head;
   receiving, by the computer processor, scores for each of the predicted bounding boxes in the set of predicted bounding boxes, where the scores for each of the predicted bounding boxes are in form of a vector;
   computing, by the computer processor, a set of intersection over union (IoU) measures for the set of predicted bounding boxes;
   grouping, by the computer processor, boxes in the set of predicted bounding boxes into one or more groups of predicted bounding boxes;
   for each group in the one or more groups of predicted bounding boxes, calculating, by the computer processor, rescores for each of the predicted bounding boxes in the set of predicted bounding boxes by performing matrix operations on the vector of scores in accordance with a closed-form expression; and
   selecting a subset of boxes from the set of predicted bounding boxes for each object in the image using the rescores for each of the predicted bounding boxes.

2. The method of claim 1 further comprises
   capturing image data for a scene using an imaging device; and
   determining the set of predicted bounding boxes from the image data.

3. The method of claim 1 further comprises sorting the scores for each of the predicted bounding boxes in the set of predicted bounding boxes in a descending order prior to the step of grouping boxes in the set of predicted bounding boxes.

4. The method of claim 3 further comprises sorting the IoU measures in the set of IoU measures using permutation of the scores for each of the predicted bounding boxes, where the IoU measures are arranged in a IoU matrix.

5. The method of claim 4 wherein grouping boxes in the set of predicted bounding boxes further comprises
   identifying a box with highest score in the set of predicted bounding boxes;
   grouping boxes from the set of predicted bounding boxes with highest overlap with the identified box into a given group;
   deleting boxes in the given group from the set of predicted bounding boxes; and
   repeating these steps until there are no boxes in the set of predicted bounding boxes.

6. The method of claim 5 further comprises calculating rescores for each of the predicted bounding boxes according to $$r g_k \approx \lfloor (I_{g_k} - M_{g_k} \odot g ) s g_k \rfloor \quad (8)$$

where I is an identity matrix, M is a mask corresponding to a given group, and P is a prune matrix which is obtained by element-wise operation of a pruning function on the IoU matrix, and the pruning function decides whether to keep a box in a set of final predictions based on overlap of IoU measures.

7. The method of claim 6 wherein the multiplication of the prune matrix with the mask only keeps a column of the prune matrix corresponding to a box having the highest score while assigning zero to remaining columns of the prune matrix.

8. The method of claim 6 wherein the pruning function is linear.

9. The method of claim 1 wherein calculating rescores for each of the predicted bounding boxes is performed using a single layer neural network.

10. A non-transitory computer-readable medium having computer-executable instructions residing thereon and that, upon execution of the instructions by a processor of a computer, cause the computer to perform the steps of:
    receiving image data for a scene from an imaging device;
    determining a set of predicted bounding boxes from the image data;
    receiving scores for each of the predicted bounding boxes in the set of predicted bounding boxes, where the scores for each of the predicted bounding boxes are in form of a vector;
    computing a set of intersection over union (IoU) measures for the set of predicted bounding boxes;
    grouping boxes in the set of predicted bounding boxes into one or more groups of predicted bounding boxes;
    for each group in the one or more groups of predicted bounding boxes, calculating rescores for each of the predicted bounding boxes in the set of predicted bounding boxes by performing matrix operations on the vector of scores in accordance with a closed-form expression; and
    selecting a subset of boxes for each object in the image from the set of predicted bounding boxes using the rescores for each of the predicted bounding boxes.

11. The non-transitory computer-readable medium of claim 10 further comprises sorting the scores for each of the predicted bounding boxes in the set of predicted bounding boxes in a descending order prior to the step of grouping boxes in the set of predicted bounding boxes.

12. The non-transitory computer-readable medium of claim 11 further comprises sorting the IoU measures in the set of IoU measures using permutation of the scores for each of the predicted bounding boxes, where the IoU measures are arranged in a IoU matrix.

13. The non-transitory computer-readable medium of claim 12 wherein grouping boxes in the set of predicted bounding boxes further comprises
    identifying a box with highest score in the set of predicted bounding boxes;
    grouping boxes from the set of predicted bounding boxes with highest overlap with the identified box into a given group;
    deleting boxes in the given group from the set of predicted bounding boxes; and
    repeating these steps until there are no boxes in the set of predicted bounding boxes.

14. The non-transitory computer-readable medium of claim 13 further comprises calculating rescores for each of the predicted bounding boxes according to $$r g_k \approx \lfloor (I_{g_k} - M_{g_k} \odot g ) s g_k \rfloor \quad (8)$$

where I is an identity matrix, M is a mask corresponding to a given group, and P is a prune matrix which is obtained by element-wise operation of a pruning function on the IoU matrix, and the pruning function decides whether to keep a box in a set of final predictions based on overlap of IoU measures.

15. The non-transitory computer-readable medium of claim 14 wherein the multiplication of the prune matrix with the mask only keeps a column of the prune matrix corresponding to a box having the highest score while assigning zero to remaining columns of the prune matrix.

16. The non-transitory computer-readable medium of claim 14 wherein the pruning function is linear.

17. The non-transitory computer-readable medium of claim 10 wherein calculating rescores for each of the predicted bounding boxes is performed using a single layer neural network.

18. A computer-implemented method for detecting objects in an image, comprising:
   capturing, by an imaging device, image data for a scene
   determining, by a computer processor, a set of predicted bounding boxes from the image data
   receiving, by the computer processor, scores for each of the predicted bounding boxes in the set of predicted bounding boxes, where the scores for each of the predicted bounding boxes are in form of a vector;
   sorting the scores for each of the predicted bounding boxes in the set of predicted bounding boxes in a descending order;
   computing, by the computer processor, a set of intersection over union (IoU) measures for the set of predicted bounding boxes;
   grouping, by the computer processor, boxes in the set of predicted bounding boxes into one or more groups of predicted bounding boxes;
   for each group in the one or more groups of predicted bounding boxes, calculating, by the computer processor, rescores for each of the predicted bounding boxes in the set of predicted bounding boxes by performing matrix operations on the vector of scores in accordance with a closed-form expression; and
   selecting, by the computer processor, one or more boxes for each object in the image from the set of predicted bounding boxes using the rescores for each of the predicted bounding boxes.

19. The method of claim 18 further comprises navigating a controlled object through the scene based on the selected one or more boxes.

* * * * *